A. FOSSEL.
HARROW.
APPLICATION FILED MAY 15, 1920.

1,402,590.

Patented Jan. 3, 1922.
2 SHEETS—SHEET 1.

Amos Fossel INVENTOR

BY *Victor J. Evans*
ATTORNEY

WITNESS:

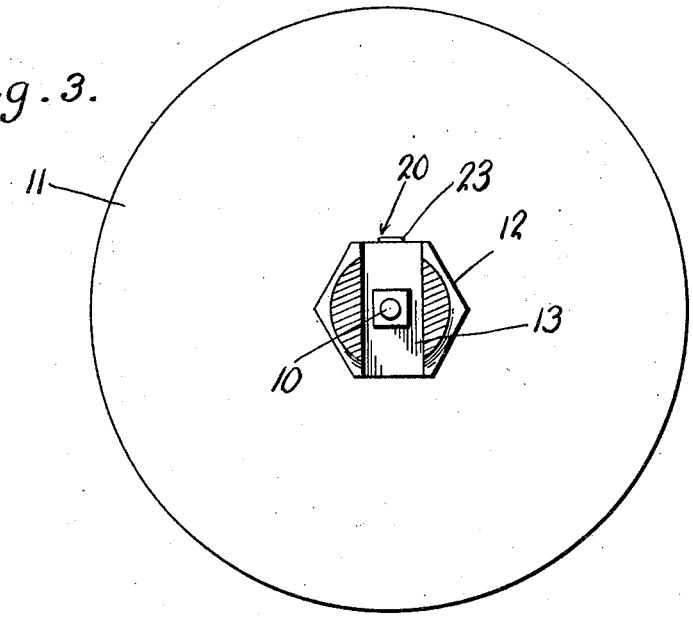
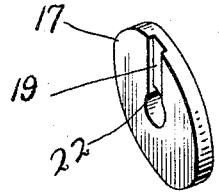
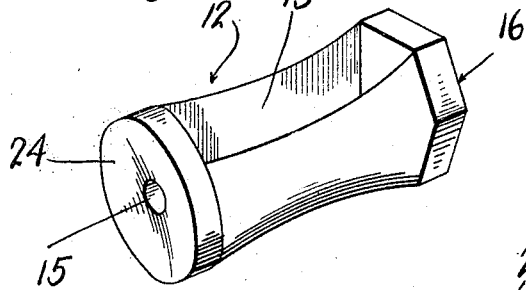
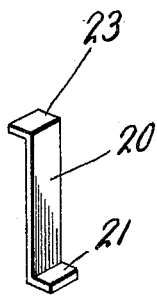

UNITED STATES PATENT OFFICE.

AMOS FOSSEL, OF GILBERT, IOWA.

HARROW.

1,402,590.

Specification of Letters Patent.   Patented Jan. 3, 1922.

Application filed May 15, 1920.   Serial No. 381,773.

*To all whom it may concern:*

Be it known that I, AMOS FOSSEL, a citizen of United States, residing at Gilbert, in the county of Story and State of Iowa, have invented new and useful Improvements in Harrows, of which the following is a specification.

This invention relates to attachments for disk harrows, and has for an object the provision of means whereby an additional disk may be secured to the end of the disk axle, to increase the area covered by the harrow.

Another object of the invention is the provision of an attachment possessing the above and other characteristics, which include a member or spool capable of being removably secured to the end of the disk axle in a manner to prevent rotation and provided with means for the attachment of the disk, the spool forming an extension of the axle and the disk carried thereby being spaced from the usual end disk.

The invention also includes the following novel features and details of construction, to be hereinafter more fully described, illustrated in the accompanying drawings and specifically pointed out in the claims hereunto appended.

In the drawings:

Figure 3 is a similar view on the line 3—3 of Figure 1.

Figure 4 is a detail perspective view of the extension spool.

Figure 5 is a similar view of the washer.

Figure 6 is a like view of the key.

Referring to the drawings in detail, like characters of reference denote the corresponding parts throughout the several views.

Figure 1:
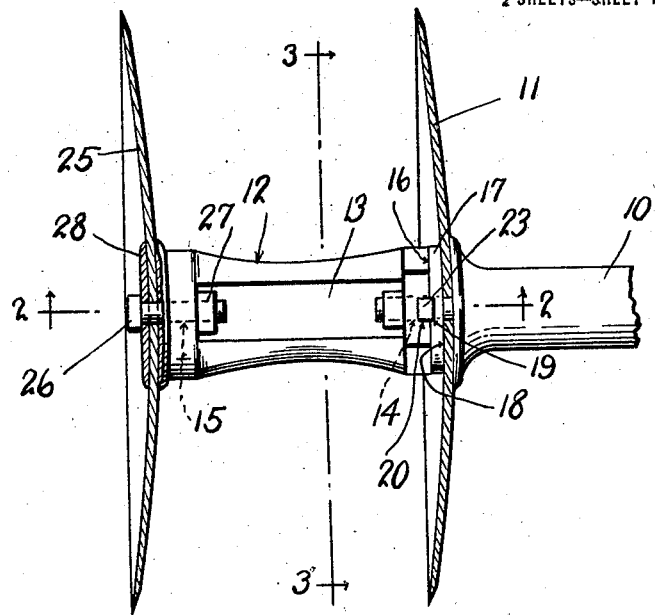
Figure 1 is a fragmentary view of the end of the axle and the disk harrow, with the invention applied thereto.
Figure 2:
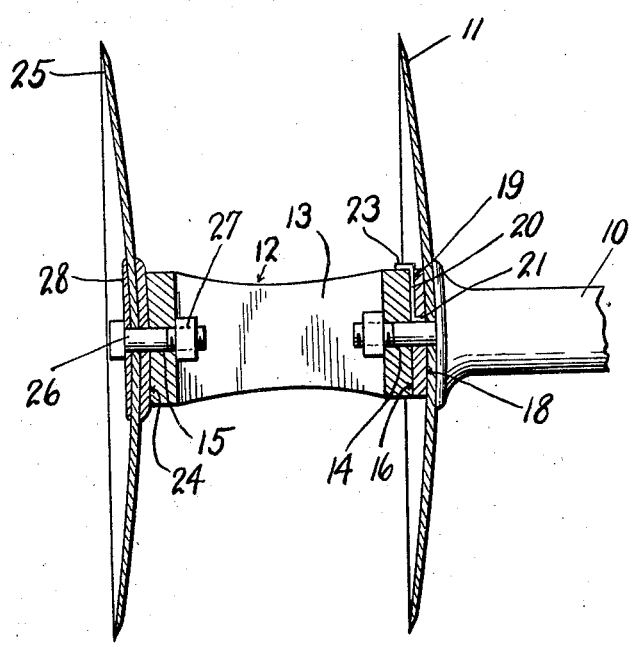
Figure 2 is a sectional view on the line 2—2 of Figure 1.

In illustrating the invention, there is shown a fragmentary portion of a disk harrow, the parts shown consisting of one end of the disk axle, which is indicated at 10, and the usual end disk which is carried thereby and which is indicated at 11.

The invention, which is designed for the purpose of increasing the length of the axle so as to permit of the attachment of an additional disk, comprises a spool 12, which is removably secured upon the end of the axle 10 in the manner to form an extension of the same. This spool is provided with an opening 13, which extends through one side of the same and which communicates with an opening 14 formed in one end of the spool and an opening 15 provided in the opposite end. The openings 14 and 15 are in longitudinal alinement and are disposed axially of the spool, the first mentioned opening being designed to receive the extremities of the axle 10. One end of the spool 12 is provided with a flat face 16 and interposed between this face of the spool and the disk 11 is a washer 17, one face of which is flat for contact with the face 16 of the spool. The opposite face of the washer is concaved as indicated at 18 so as to receive the face of the disk 11, the usual washer being removed for this purpose. The washer is provided in the face which contacts with the face 16 of the spool 12, with a radially arranged groove or seat 19, which is adapted to receive a key 20. The inner end of this key is bent at right angles as shown at 21 and this bent extremity enters the opening 22 provided in the washer 17, which opening is oblong. The insertion of the end 21 of the key 20 within this opening, renders the latter substantially square so as to engage the square portion of the axle 10 and prevent the washer from turning. The opposite end of the key is bent at right angles in the direction opposite to the end 21, as shown at 23, and this last mentioned end engages the adjacent edge of the spool 12, which is shown as hexagonal. The spool will thus be prevented from turning upon the axle 10.

The opposite end of the spool is provided with a concaved face 24, which is adapted to receive an additional disk 25, while passing through this disk and the opening 15 of the spool is a bolt 26. A nut 27 is mounted upon the inner end of the bolt 26, while the usual washer, for example, the washer previously removed from the end of the axle 10 is positioned between the head of the bolt and the disk 25 as shown at 28.

The invention is susceptible of various changes in its form, proportions and minor details of construction, and the right is herein reserved to make such changes as properly fall within the scope of the appended claims.

Having described the invention what is claimed is:

1. The combination with a disk harrow, of an extension member capable of being positioned at the end of the disk axle, means for securing one end of the member to the extremity of the axle, a washer interposed between the end of the member and the face of the adjacent disk, said washer having a radially disposed seat in one face thereof, a key engageable in said seat and also engaging the extension member for holding the latter against rotation and means whereby a disk may be secured to the opposite end of the member.

2. The combination with a disk harrow, of an extension spool having an opening extending inwardly from one side of and communicating with axially arranged openings in each end of the spool, one of the last mentioned openings receiving the extremity of the disk axle, a lock washer interposed between the end of the spool and the face of the adjacent disk, a substantially Z-shaped locking element engageable with the washer, the axle and spool to prevent relative rotary movement and means for securing a disk to the opposite end of the spool.

In testimony whereof I affix my signature.

AMOS FOSSEL.